United States Patent
George et al.

(10) Patent No.: US 10,884,804 B2
(45) Date of Patent: Jan. 5, 2021

(54) INFORMATION GATHERING COMMAND GENERATOR

(71) Applicant: International Business Machines Corporation, Armonk, NY (US)

(72) Inventors: David P. George, Eastleigh (GB); Daniel Brook Sheard, Cheshire (GB); Samuel J. Smith, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 15/790,456

(22) Filed: Oct. 23, 2017

(65) Prior Publication Data
US 2019/0121670 A1 Apr. 25, 2019

(51) Int. Cl.
  *G06Q 10/00* (2012.01)
  *G06F 9/50* (2006.01)

(52) U.S. Cl.
  CPC .................. *G06F 9/5005* (2013.01)

(58) Field of Classification Search
  None
  See application file for complete search history.

(56) References Cited

U.S. PATENT DOCUMENTS

| | | | | |
|---|---|---|---|---|
| 8,005,700 B2* | 8/2011 | Amitabh | ........ | G06Q 10/10 705/7.11 |
| 8,340,991 B2* | 12/2012 | Yaskin | ........ | G06Q 10/0639 705/7.11 |
| 8,340,992 B2* | 12/2012 | Yaskin | ........ | G06Q 30/0203 705/7.11 |
| 8,571,910 B2* | 10/2013 | Lyras | ........ | G06F 16/31 705/7.11 |
| 9,009,189 B2 | 4/2015 | Anand et al. | | |
| 9,116,996 B1 | 8/2015 | Provine et al. | | |
| 2007/0150846 A1* | 6/2007 | Furnish | ........ | G06F 30/394 716/122 |

(Continued)

OTHER PUBLICATIONS

Sinnen, Oliver, Contention-Aware Scheduling with Task Duplication, Oct. 5, 2010, Elsevier, http://www.ic.uff.br/~boeres/slides_AP/papers2010/Sinnen2010ContentionAwareJPDC.pdf, p. 1-10.*

(Continued)

*Primary Examiner* — Joseph M Waesco
(74) *Attorney, Agent, or Firm* — Schmeiser, Olsen & Watts, LLP; Nicholas L. Cadmus

(57) ABSTRACT

A method of generating a sequence of commands to gather information using a directed tree graph includes providing a plurality of goals, each goal having a weighting, and a set of commands that lead to completion of the goals. A directed tree graph is constructed comprising a root node, respective leaf nodes associated with the goals, and one or more parent nodes. Each node is associated with one command, the command having the potential to complete any goals associated with the node and all the goals associated with any subordinate nodes. The priority of each command is determined, based on the sum of the goal weightings of leaf nodes subordinate to the node associated with the command. One or more commands is executed, a command having a higher priority being executed before a command having a lower priority.

18 Claims, 9 Drawing Sheets

(56) References Cited

U.S. PATENT DOCUMENTS

| | | | |
|---|---|---|---|
| 2007/0204252 A1* | 8/2007 | Furnish | G06F 30/392 716/122 |
| 2008/0216025 A1* | 9/2008 | Furnish | G06F 30/392 716/132 |
| 2008/0216038 A1* | 9/2008 | Bose | G06F 30/392 716/118 |
| 2008/0216039 A1* | 9/2008 | Furnish | G06F 30/39 716/126 |
| 2008/0216040 A1* | 9/2008 | Furnish | G06F 30/392 716/122 |
| 2009/0254874 A1* | 10/2009 | Bose | G06F 30/39 716/113 |
| 2010/0010952 A1* | 1/2010 | Kuhn | G06Q 10/04 706/47 |
| 2013/0080641 A1* | 3/2013 | Lui | H04L 43/045 709/226 |
| 2016/0179877 A1 | 6/2016 | Koerner et al. | |
| 2017/0109356 A1* | 4/2017 | Sawal | G06F 16/3322 |
| 2017/0302521 A1* | 10/2017 | Lui | H04L 43/0817 |

OTHER PUBLICATIONS

Anitha, D, A Review on Software Testing Framework in Cloud Computing, 2014, International Journal of Computer Science and Information Technologies, vol. 5 (6), https://pdfs.semanticscholar.org/fb61/5bfafe0f38e8e508367b481a15dd7e70a044.pdf, p. 1-10.*

* cited by examiner

INFORMATION GATHERING COMMAND GENERATOR

TECHNICAL FIELD

The present invention relates to an information gathering command generator, and more particularly to a directed tree graph for generating commands to gather information.

BACKGROUND

In a prior art directed tree graph used to gather information to achieve a goal, a first question is asked, followed by subsequent questions from a list of questions, the subsequent questions asked being determined by the information provided in the response to the previous question.

SUMMARY

An aspect of this invention relates to a method, a command generation engine, and a computer program product. A processor of a computing system provides a plurality of goals, each goal of the plurality of goals having a weighting associated with the goal and providing a set of commands that, when executed, lead to a completion of the plurality of goals. A directed tree graph is constructed, the directed tree graph comprising a root node, a respective plurality of leaf nodes associated with each goal of the plurality of goals, and one or more parent nodes, each node being associated with one command of the set of commands, the associated command of the set of commands having a potential, when executed to complete any goals associated with the node and all of the plurality of goals associated with any nodes subordinate to the node. A priority of each command of the set of commands is determined, based on a sum of the weightings associated with the goals associated with leaf nodes subordinate to the node associated with the command of the set of commands. One or more of the set of commands is executed, a command having a higher priority being executed before a command having a lower priority, any goal being satisfied by a response from a user to the command having the weighting associated with the goal changed to zero, the command being marked as completed, the determining the priority of each command of the set of commands being repeated after executing each the command.

DETAILED DESCRIPTION

Figure 1:
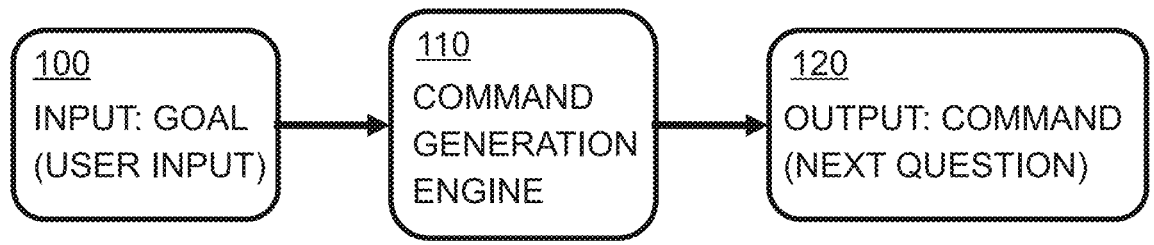
FIG. 1 shows a command generation engine for receiving goals to generate commands, which, when executed, lead to completion of a plurality of goals, in accordance with embodiments of the present invention.

For current directed tree graphs used to gather information to achieve a goal, a first question is asked, followed by subsequent questions from a list of questions, the subsequent questions asked being determined by the information provided in the response to the previous question. This is inefficient because depending on the responses provided by the user, the questions asked may not be the questions that have the highest likelihood of completing gaps in the information.

According to an embodiment of the invention, a computer-implemented method of generating a sequence of commands to gather information using a directed tree graph may include the steps of providing a plurality of goals, each one of said plurality of goals having a weighting associated with the goal and providing a set of commands that, when executed, lead to completion of said plurality of goals, constructing a directed tree graph, said directed tree graph comprising a root node, a respective plurality of leaf nodes associated with each of said plurality of goals, and one or more parent nodes, each node being associated with one of said set of commands, said associated one of said set of commands having the potential, when executed to complete any goals associated with said node and all of said plurality of goals associated with any nodes subordinate to said node, determining the priority of each one of said set of commands, based on the sum of said weightings associated with goals associated with leaf nodes subordinate to the node associated with said one of said set of commands, and executing one or more of said commands, a command having a higher priority being executed before a command having a lower priority, any goal being satisfied by a response from a user to said command having said weighting associated with said goal changed to zero, said command being marked as completed, said determining the priority of each one of said set of commands being repeated after executing each said command.

Embodiments of the invention provide a command generation engine for generating a sequence of commands to gather information, the command generation engine including a plurality of goals, each one of said plurality of goals having a weighting associated with the goal and a set of commands that, when executed, lead to completion of said plurality of goals; a directed tree graph, comprising a root node, a respective plurality of leaf nodes associated with each of said plurality of goals, and one or more parent nodes, each node being associated with one of said set of commands, said associated one of said set of commands having the potential, when executed to complete any goals associated with said node and all of said plurality of goals associated with any nodes subordinate to said node, a command priority determiner which determines the priority of each one of said set of commands, based on the sum of said weightings associated with goals associated with leaf nodes subordinate to the node associated with said one of said set of commands, and a command execution module which executes one or more of said commands, a command having a higher priority being executed before a command having a lower priority, any goal being satisfied by a response from a user said command having said weighting associated with said goal changed to zero, said command being marked as completed, said determining the priority of each one of said set of commands being repeated after executing each said command.

Embodiments of the invention also provide a computer program product for generating a sequence of commands to gather information using a directed tree graph, the computer program product comprising: a computer readable storage medium having program instructions embodied therewith, the program instructions executable by a computer to cause the computer to: provide a plurality of goals, each one of said plurality of goals having a weighting associated with the goal and providing a set of commands that, when executed, lead to completion of said plurality of goals; construct a directed tree graph, said directed tree graph comprising a root node, a respective plurality of leaf nodes associated with each of said plurality of goals, and one or more parent nodes, each node being associated with one of said set of commands, said associated one of said set of commands having the potential, when executed to complete any goals associated with said node and all of said plurality of goals associated with any nodes subordinate to said node, determine the priority of each one of said set of commands, based on the sum of said weightings associated with goals associated with leaf nodes subordinate to the node associated with said one of said set of commands, and execute one or more of said commands, a command having a higher priority being executed before a command having a lower priority, any goal being satisfied by a response from a user to said command having said weighting associated with said goal changed to zero, said command being marked as completed, said determining the priority of each one of said set of commands being repeated after executing each said command.

FIG. 1 shows a command generation engine 110 for receiving input goals 100 to generate commands 120, which, when executed, lead to completion of a plurality of goals, in accordance with embodiments of the present invention. Goals 100 are received from a user and in an exemplary embodiment described below may, for example, relate to whether the user wishes to use a Closed Circuit Television (CCTV) system to record indoors or outdoors, at day or at night or to view remotely or not. Commands 120 are questions asked of the user, which help to determine which goals have been completed and what further questions need to be asked in order to complete the maximum number of goals possible. In an exemplary embodiment described below, the commands may be, for example, whether the user wishes to monitor indoors or outdoors, whether the user will use the CCTV system at night or at short or long distances or to view remotely. Although the embodiments described below refer to commands and goals associated with a CCTV system, embodiments of the present invention may be used with commands and goals of any type, such as for example to select any other type of product, such as a vehicle, or a type of food or any other type of product. Further, embodiments of the present invention may be used with commands and goals to carry out diagnosis of any type.

Figure 2:
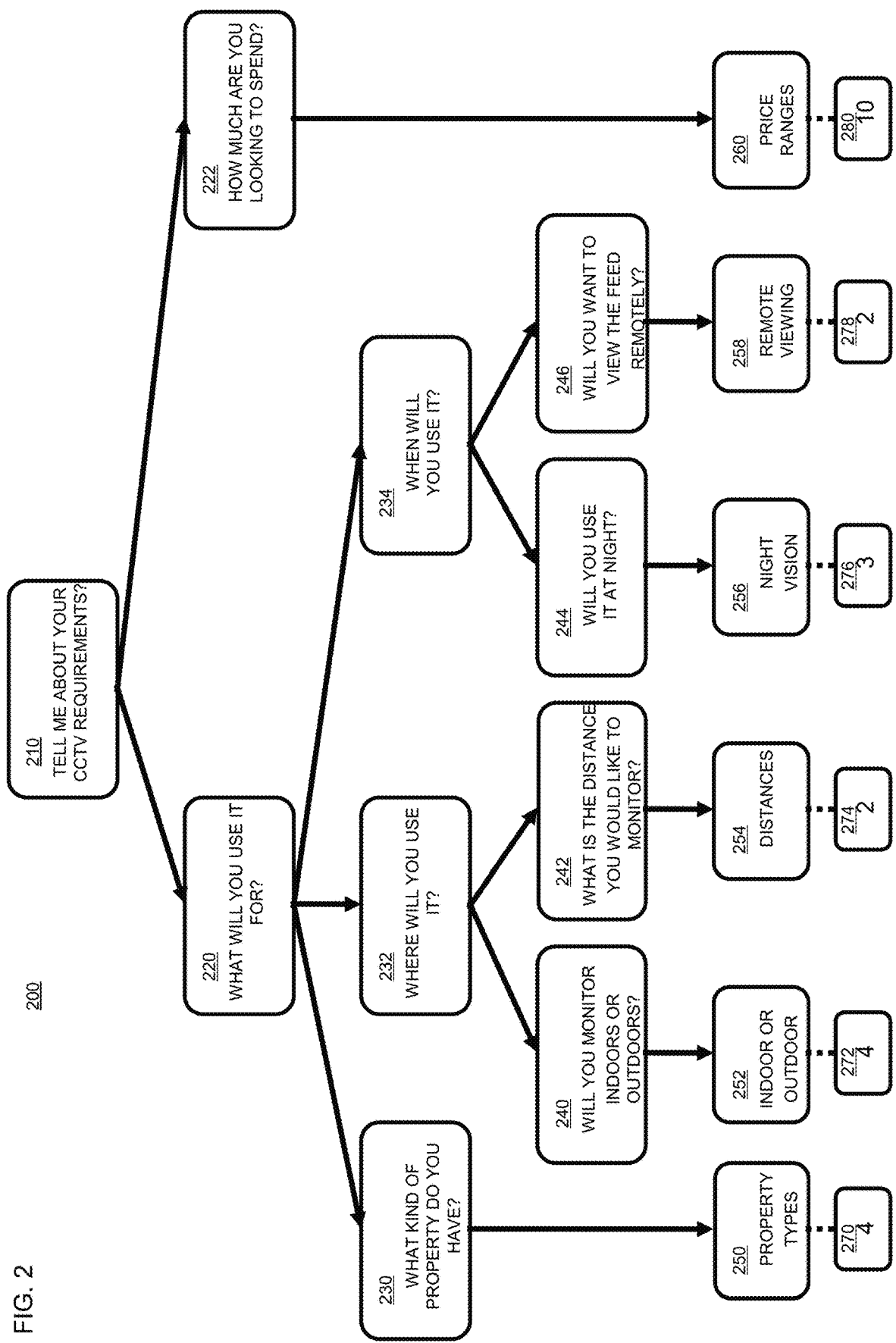
FIG. 2 shows an example directed tree graph generated with leaf nodes representing goals and other nodes representing commands, in accordance with embodiments of the present invention.

FIG. 2 shows an example directed tree graph 200 generated with nodes 210-246 having associated commands 120, in accordance with embodiments of the present invention. A rooted, directed tree graph 200 is constructed with a leaf node 222, 230, 240-246 associated with each goal 250-260. For example, leaf node 240 is associated with the goal 252 "indoor or outdoor". Each parent node 220, 232, 234 in the directed tree graph 200 is associated with a command 120 that, once executed, is likely to lead to the completion of the goal 250-260 associated with a node 230, 240-246 subordinate to that parent node 220, 232-234. For example, parent node 232 is associated with the command 120 "Where will you use it?" Once executed, this command 120 is likely to lead to the completion of the goal 252 "indoor or outdoor" that is associated with the leaf node 240 and the goal 254 "distances" that is associated with the leaf node 242. The root node 210 is associated with a command 120 that, when executed, has potential to complete all of the goals 250-260 without the need for further commands 120 to be executed. Commands 120 associated with the root node 210 are ambiguous and aim to complete the specific goals 250-260. For example, the command 120 "Tell me about your CCTV requirements", associated with root node 210 may result in the input "I wish to record outdoors at my home close to the house, including at night and be able to view the recordings remotely and I want to spend between $300 and $600". The input will complete all of the goals 250-260 associated with leaf nodes 222, 230, 240-246. Such a concise, specific input may or may not be likely, but the specific input s possible. Commands 120 associated with the leaf nodes 222, 230, 240-246 are unambiguous and aim to complete the specific goal 250-260 with which the commands 120 are associated.

The priority of each command 120 associated with the nodes 210-246 is determined based on the weightings 270-280 associated with the goals 250-260 and the priority of any commands 120 associated with child nodes 220-246 of the node 210-246. The weightings 270-280 are typically based on the importance of the goal 250-260 that needs to be completed. For example, if there are two goals 250-260 that are the color of the enclosure of the CCTV system and the price range, then the color of the enclosure of the CCTV system will typically have a lower weighting than the price range. The weightings of 2, 3, 4 and 10 shown in FIG. 2 are purely exemplary and not in any way intended to restrict the range of weighting that may be used. Any number of different weightings may be used and as the weightings used are relative weightings, in an embodiment of the example of FIG. 2, the weightings might be 20, 30, 40 and 100 instead of 2, 3, 4 and 10.

The priority of the command 120 associated with node 232 is determined based on the weightings 272-274 associated with the goals 252-254 and the priority of any commands 120 associated with child nodes 240, 242 of the node 232, which will be explained in more detail with reference to FIGS. 3 and 4. Goals 250-260 can be marked as completed, which removes the weighting 270-280 assigned to that goal 250-260, which will be explained in more detail with reference to FIGS. 5 to 8. Commands 120 can be marked as executed, which means that the commands will not be executed again, windmill be explained in more detail with reference to FIGS. 5, 6 and 8.

Figure 3:
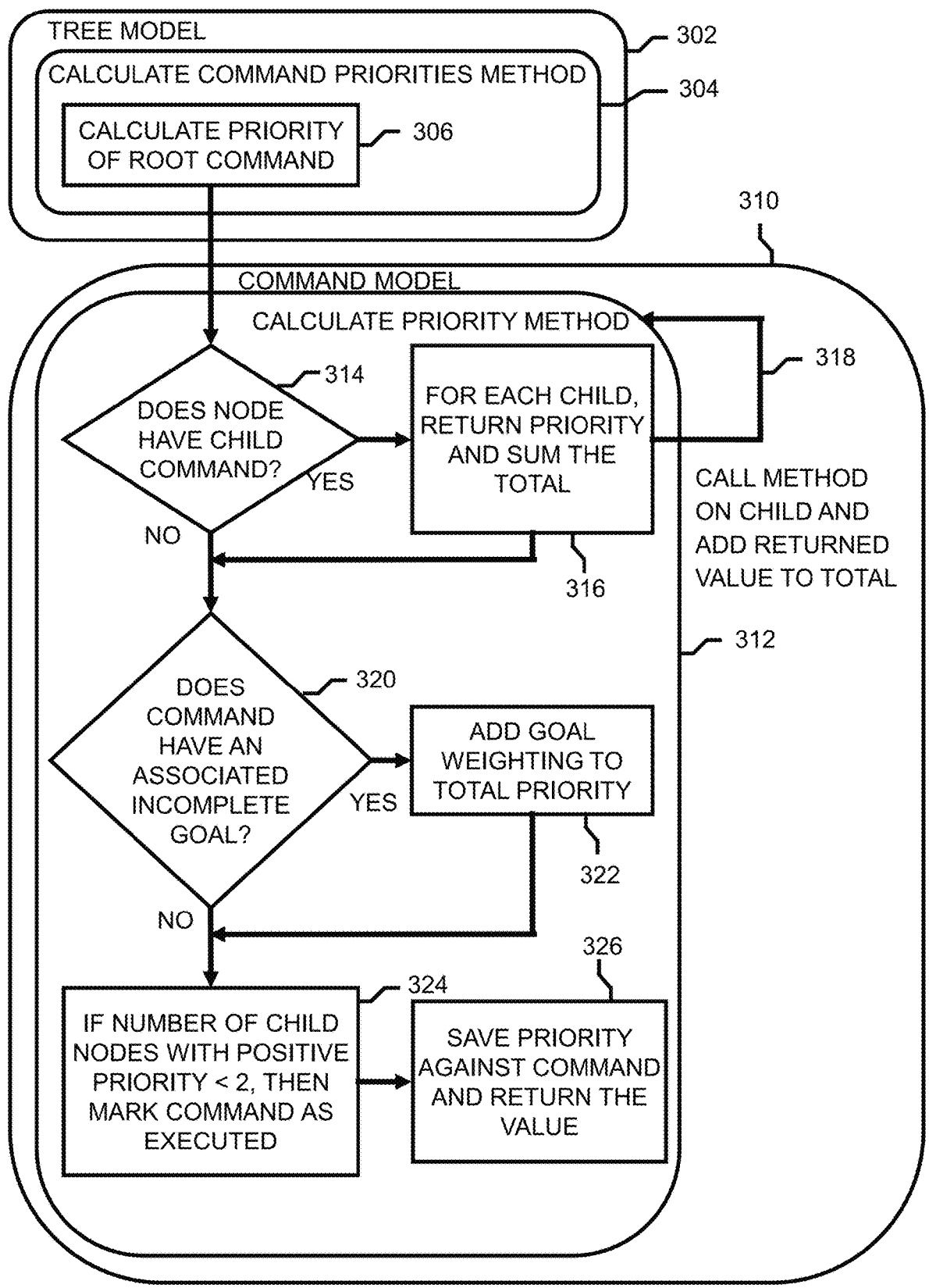
FIG. 3 shows a flow chart of determining a priority weighting associated with each command, in accordance with embodiments of the present invention.

FIG. 3 shows a flow chart of determining a priority weighting associated with each command, in accordance with embodiments of the present invention. The priority of each command 120 is determined based on the priority weighting of any assigned goal weighting and the priority weighting of any child commands. Goals can be marked as complete, which removes the assigned goal weighting. Commands can be marked as executed, which means that the commands will not be executed again.

In tree model 302 is a "CALCULATE COMMAND PRIORITIES METHOD" 304. In the "CALCULATE COMMAND PRIORITIES METHOD" 304, there is a method to calculate the priority of the root command 306. Method 306 calls a calculate priority method 312 in a command model 310.

At step 314, a check is made as to whether the node for which a priority weighting is to be calculated has one or more child commands associated with the node. In the case of the root node 210, there are two child nodes 220 and 222. As there are child nodes, processing proceeds to step 316. The priority weighting for each of the child nodes 220 and 222 is then calculated and the total of the priorities of all of the child nodes 220 and 222 is summed to generate a priority weighting for the root node 210. Considering child node 222 first, the method 312 is recursively called 318 and the priority weighting is calculated. As child node 222 does not itself have a child node, processing moves from step 314 to step 320. At step 320, a check is made as to whether node 222 has an associated incomplete goal 250-260. Node 222 does have an associated incomplete goal 260. As node 222 does have an associated incomplete goal 260, then processing moves to step 322 and the goal weighting 280 of goal 260, in this case a value of 10, is added to the total priority. Processing moves to step 324. At step 324, a check is made as to whether the number of child nodes with a positive priority is less than 2. If the number is less than 2, then the command 120 associated with node 222 is marked as executed. The reason for the marking as executed is that such a child command is typically less ambiguous and therefore more likely to result in completion of the associated goals. At step 326, the priority is saved against the command 120 and the value is returned. For node 222, the value saved is 10, the goal weighting associated with the associated incomplete goal 250-260. Returning now to step 316, the method for node 210, which is executed for each child of node 210. Node 210 has another child, node 220. The calculation of the priority weighting for node 220 is carried out in the same manner as described above for node 222.

Node 220 has a child node 230. At step 314, node 230 does not have a child node, but at step 320, node 230 does have an associated incomplete goal 250 with a weighting 270 of 4. At step 322, node 230 is assigned a priority weighting of 4.

Node 220 also has a child node, node 232, which itself has two child nodes, node 240 and node 242. Node 240 has an associated incomplete goal 252 with a goal weighting 272 of 4. The priority weighting for node 240 is then calculated as the sum of the priority weightings of the children of node 240, in this case the sole child of node 240, of 4. Node 240 is assigned a priority weighting of 4. Node 242 has an associated incomplete goal 254 with a goal weighting 274 of 2. The priority weighting for node 242 is then calculated as the sum of the priority weightings of the children of node 242, in this case the sole child of node 242, of 2. Node 242 is assigned a priority weighting of 2. As mentioned above, node 232 has two child nodes, node 240 and node 242. At step 316 for node 232, the priority weighting for each of the child nodes of node 232 is summed, in this case 4 for node 240 and 2 for node 242, giving node 232 a priority weighting of 6.

Node 220 has a further child node, node 234, which itself has two child nodes, node 244 and node 246. Node 244 has an associated incomplete goal 256 with a goal weighting of 3. The priority weighting for node 244 is then calculated as the sum of the priority weightings of the children of node 244, in this case the sole child of node 244, of 3. Node 244 is assigned priority weighting of 3. Node 246 has an associated incomplete goal 258 with a goal weighting 278 of 2. The priority weighting for node 246 is then calculated as the sum of the priority weightings of the children of node 246, in this case the sole child of node 246, of 2. Node 246 is assigned a priority weighting of 2. As mentioned above, node 234 has two child nodes, node 244 and node 246. At step 316 for node 234, the priority weighting for each of the child nodes of node 234 is summed, in this case 3 for node 244 and 2 for node 246, giving node 234 a priority weighting of 5.

As mentioned above, node 220 has three child nodes, node 230, node 232 and node 234. At step 316 for node 220, the priority weighting for each of the child nodes of nod 220 is summed, in this case 4 for node 230, 6 for node 232 and 5 for node 234, giving node 220 a priority weighting of 15.

As mentioned above, node 210 has two child nodes, node 220 and node 222. At step 316 for node 210, the priority weighting for each of the child nodes of node 210 is summed, in this case 15 for node 220 and 10 for node 222, giving node 210 a priority weighting of 25.

Figure 4:
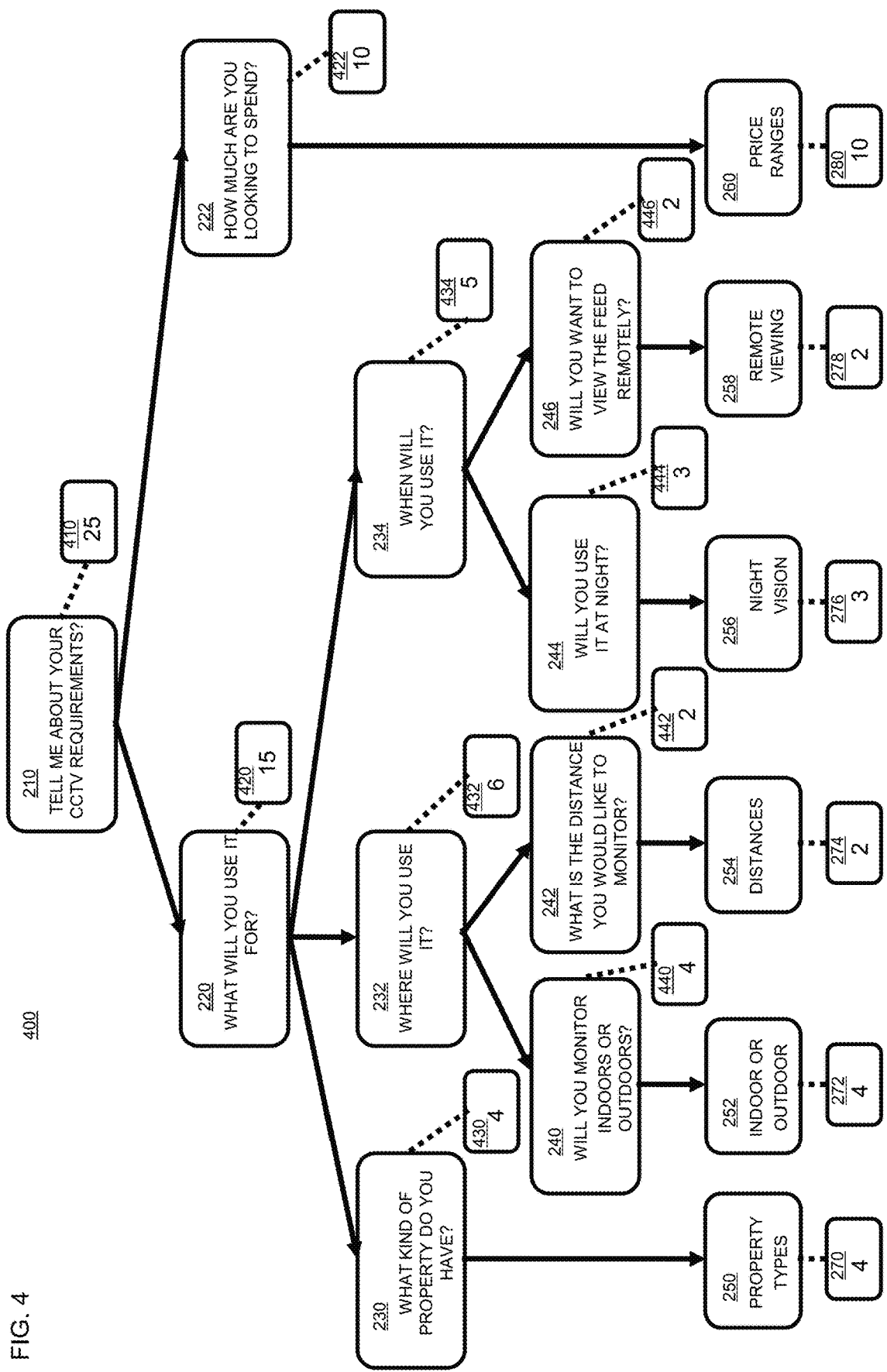
FIG. 4 shows a directed tree graph of FIG. 2 showing the priority weightings assigned to each node other than leaf nodes, in accordance with embodiments of the present invention.

FIG. 4 shows a directed tree graph 200 of FIG. 2 showing the priority weightings 410-446 assigned to each node 210-246, in accordance with embodiments of the present invention.

Leaf node 230 has one incomplete goal 250 with a weighting of 4 and so is assigned a priority weighting 430 of 4. Leaf node 240 has one incomplete goal 252 with a weighting of 4 and so is assigned a priority weighting 440 of 4. Leaf node 242 has one incomplete goal 254 with a weighting of 2 and so is assigned a priority weighting 442 of 2. Leaf node 244 has one incomplete goal 256 with a weighting of 3 and so is assigned a priority weighting 444 of 3. Leaf node 246 has one incomplete goal 258 with a weighting of 2 and so is assigned a priority weighting of 2. Leaf node 222 has one incomplete goal 260 with a weighting of 10 and so is assigned a priority weighting 446 of 10.

Parent node 232 has two child nodes 240, 242 with respective weightings of 4 and 2 and so is assigned a priority weighting 432 of the sum of these two weightings, that is 6. Parent node 234 has two child nodes 244, 246 with respective weightings of 3 and 2 and so is assigned a priority weighting 434 of the sum of these two weightings, that is 5. Parent node 220 has three child nodes 230, 232, 234 with respective weightings of 4, 6 and 5 and so is assigned a priority weighting 420 of the sum of these two weightings, that is 15. Root node 210 has two child nodes 220, 222 with respective weightings of 15 and 10 and so is assigned a priority weighting 410 of the sum of these two weightings, that is 25.

Figure 5:
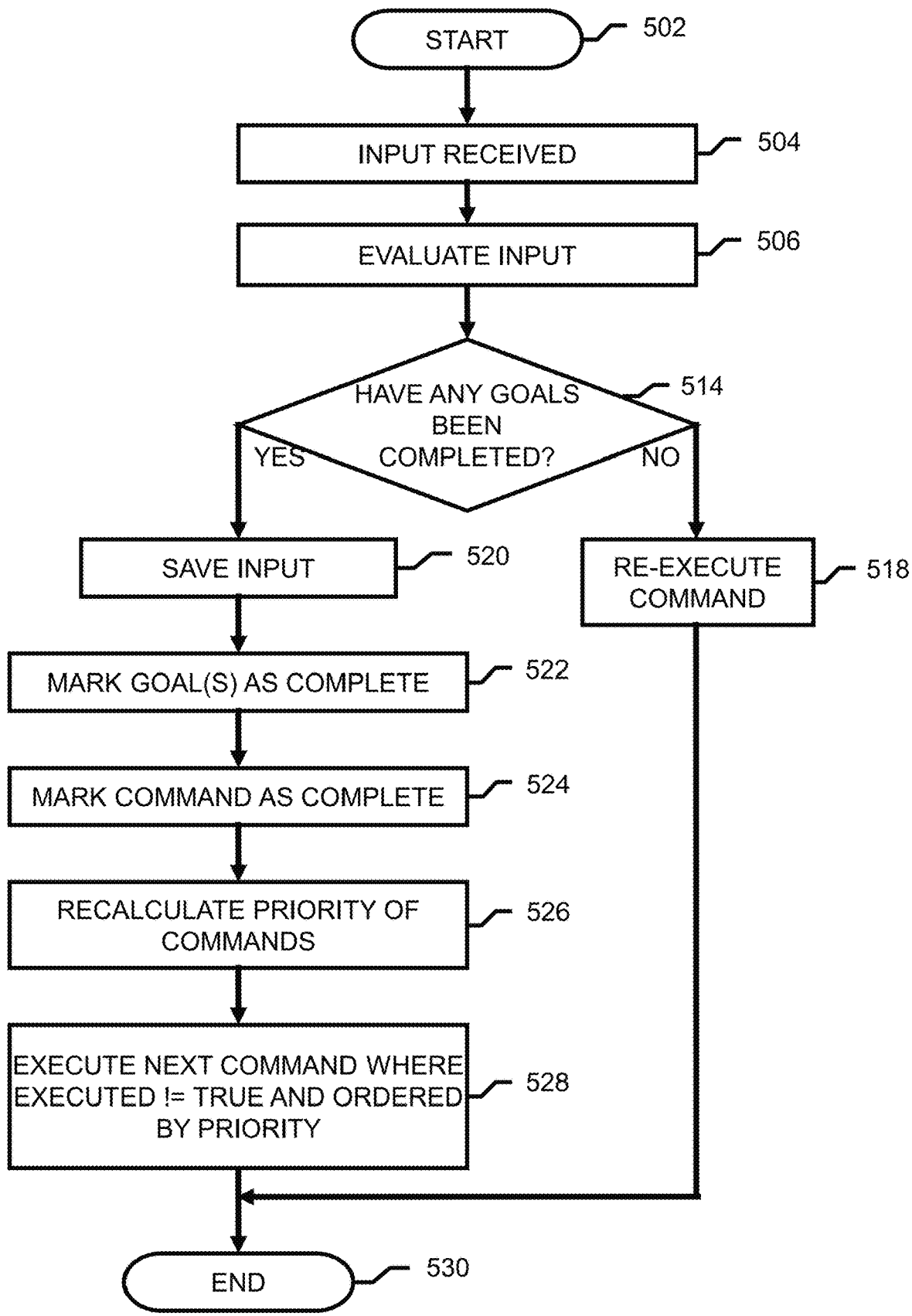
FIG. 5 shows a flow chart of a first embodiment of processing the commands represented by the nodes of FIG. 2 in which a command is re-executed in the event of no goals being completed, in accordance with embodiments of the present invention.

FIG. 5 shows a flow chart of a first embodiment of processing the commands 120 represented by the nodes 210-246 of FIG. 2 in which a command 120 is re-executed in the event of no goals 250-260 being completed, in accordance with embodiments of the present invention.

The processing of the command associated with the highest priority weighting node 210 will now be described. The first embodiment of the method of processing commands begins at step 502. At step 504, the input 100 is received. With reference to the directed tree graph 200 of FIGS. 2 and 4, a first example input 100 might be "I want one in a color to match my interior design". A second example input 100 might be "I wish to use the CCTV at night". A third example input 100 might be "I wish to monitor my home indoors". A fourth example input 100 might be "I wish to record outdoors at my home close to the house, including at night and be able to view the recordings remotely and I want to spend between $300 and $600". At step 506, the received input 100 is evaluated to enable a determination to be made as to whether any goals 250-260 have been completed. For example, in an embodiment, synonyms of words used in goals 250-260 may have been used such as "inside" instead of "indoors" or more specific descriptions such as "apartment" instead of "home".

At step 514, a determination is made as to whether any goals 250-260 have been completed. In the first exemplary input above, none of the goals 250-260 have been completed, as color preference is not pertinent to any of the goals 250-260. In the second exemplary input 100 above, the goal of night vision 256 has been completed. In the third exemplary input 100 above, the two goals of property type 250 and indoor or outdoor 252 have been completed. In the fourth exemplary input 100 above, all of the goals of property type 250, indoor or outdoor 252, distances 254, night vision 256, remote viewing 258 and price ranges 260 have been completed.

At step 518, if none of the goals 250-260 have been completed, then the command 120 is re-executed, which corresponds to the first exemplary input above. In the first exemplary input, the user responded to the command "Tell me about your CCTV requirements" with the input "I want one in a color to match my interior design". In an embodiment, the command 120 is simply re-executed and the user is asked again "Tell me about your CCTV requirements" and the expectation is that the user will respond with input that more directly responds to the question. In another embodiment, additional information might be provided to the user to assist the user in providing a response that will more likely complete one or more of the goals 250-260. The method ends at step 530.

At step 514, if one or more of the goals 250-260 have been completed, then processing moves to step 520. At step 520, the user input is saved. At step 522, one or more of the goals 250-260 is marked as completed, which corresponds to any of the second to fourth exemplary inputs above. In the second exemplary input, the goal 256 is marked as completed, in the third exemplary input, the goals 250 and 252 are marked as completed and in the fourth exemplary input, the goals 250, 252, 254, 256, 258 and 260 are marked as completed.

At step 524, the command 120 associated with node 210 is marked as completed.

Figure 6:
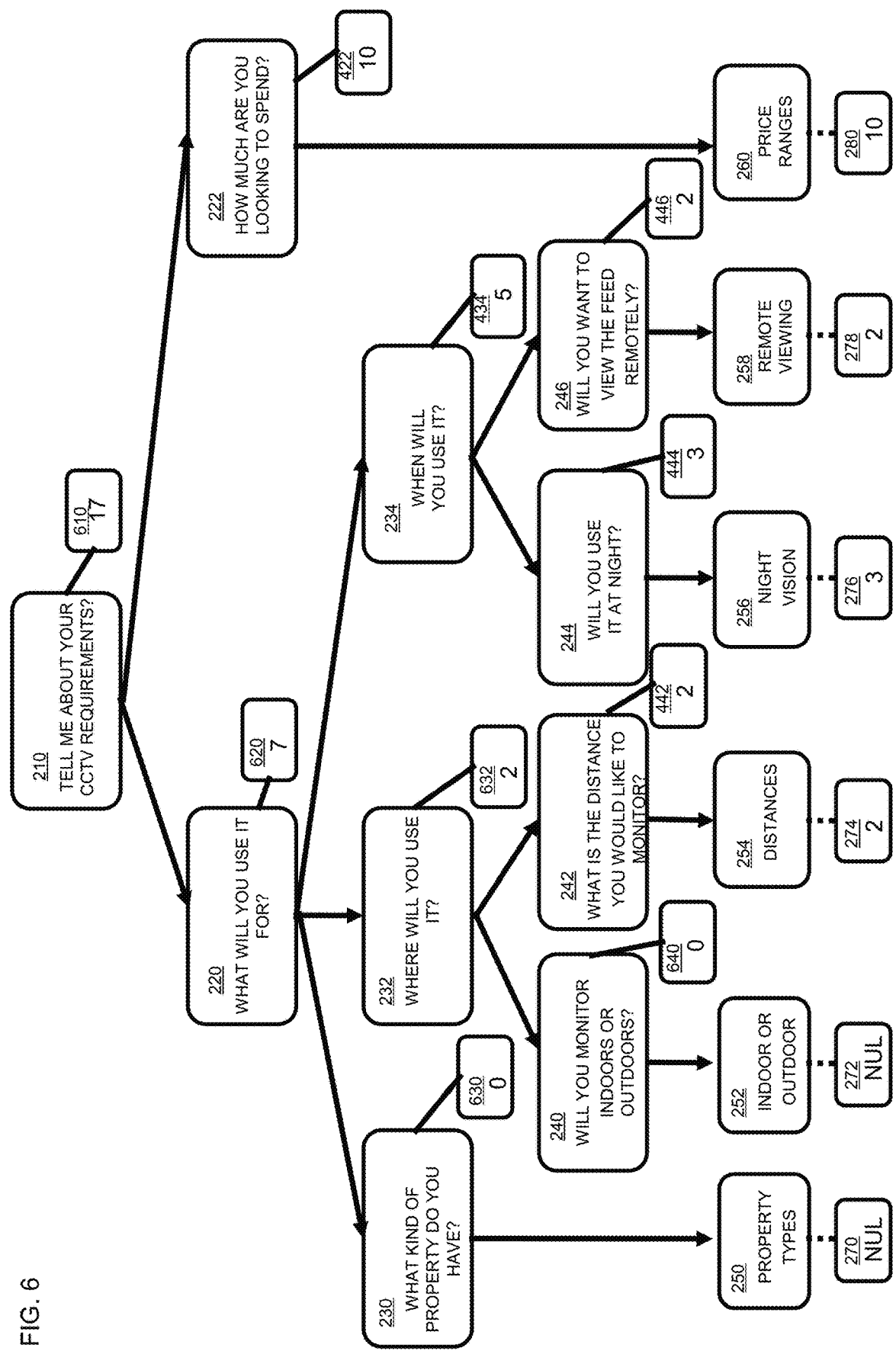
FIG. 6 shows a directed tree graph of FIG. 2 after execution of the command associated with the root node, in accordance with embodiments of the present invention.

At step 526, the priority of each command 120 is recalculated. In the second exemplary input, as the goal 256 is marked as completed, the priority weighting of node 244 changes from 3 to 0, of node 234 changes from 5 to 2 and of node 220 changes from 15 to 12. In the third exemplary input, as the goals 250 and 252 are marked as completed, the priority weighting of node 230 changes from 4 to 0, of node 240 changes from 4 to 0, of node 232 from 6 to 2 and of node 220 from 15 to 7. The priority weightings are shown in FIG. 6. In the fourth exemplary input, as all of the goals 250, 254, 256, 258 and 260 are marked as completed, then the priority weightings of nodes 230, 240-246 and 220 are changed to 0 as are the priority weightings of nodes 232 and 234 as well as node 220.

At step 528, the next command 120 is executed which has not already been executed and which has the highest priority of the commands 120 which have not been executed. In the second exemplary input, the command 120 associated with node 220 has a priority weighting of 12 which is the highest remaining priority weighting. So the command 120 is issued to ask the user "What will you use it for?". In the third exemplary input, the command 120 associated with node 222 has a priority weighting of 10. So the command 120 is issued to ask the user "How much are you looking to spend?". In the fourth exemplary input, there are no commands left that have priorities other than 0, so no further commands are issued. The method ends at step 530.

FIG. 6 shows a directed tree graph 200 of FIG. 2 after execution of the command associated with the root node 210, in accordance with embodiments of the present invention. The directed tree graph 200 shown in FIG. 6 corresponds to the third exemplary input described above with reference to FIG. 5. Goals 250 and 260 are completed and are shown as having a NUL or 0 value. The corresponding priority weightings of node 230 and node 240 are also 0. The priority weighting of node 232 changes from 6 to 2. The priority weighting of node 220 changes from 15 to 7. The priority weighting of node 210 changes from 25 to 17.

Figure 7:
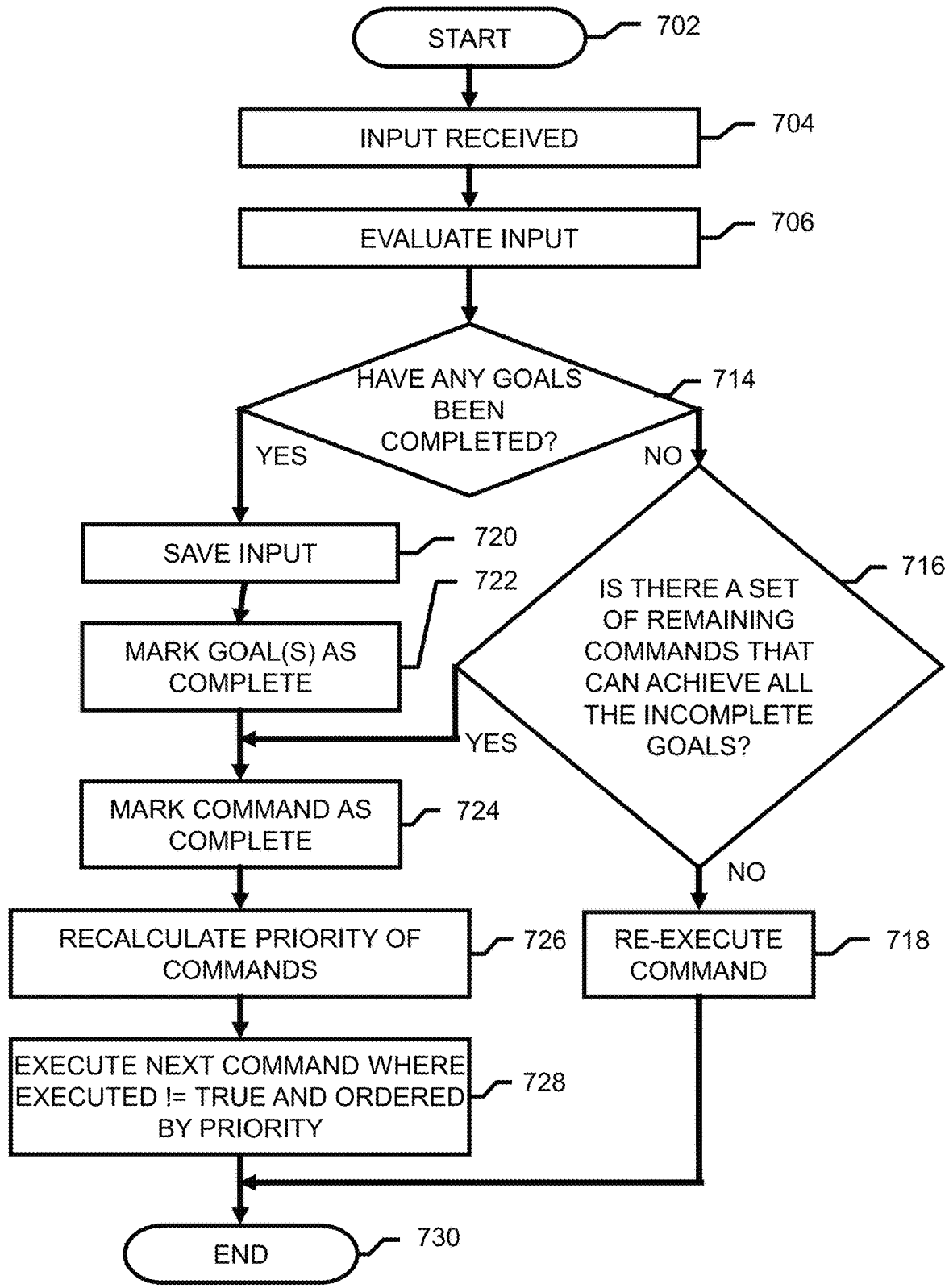
FIG. 7 shows a flow chart of a second embodiment of processing the commands represented by the nodes of FIG. 2 in which a command is not re-executed in the event of no goals being completed if there are still unexecuted commands that could lead to the completion of all incomplete goals, in accordance with embodiments of the present invention.

FIG. 7 shows a flow chart of a second embodiment of processing the commands 120 represented by the nodes 210-246 of FIG. 2 in which a command 120 is not re-executed in the event of no goals 250-260 being completed if there is still a set of unexecuted commands 120 that could lead to the completion of all incomplete goals 250-260, in accordance with embodiments of the present invention.

Steps 702 to 714 and 718 to 730 correspond to steps 502 to 514 and 518 to 530 of FIG. 5 and will not be described again. Responsive to a determination at step 514 that none of the goals 250-260 have been completed, then in the first embodiment of FIG. 5, processing would have proceeded to step 518. In FIG. 7, responsive to a determination at step 714 that none of the goals 250-260 have been completed, then in the second embodiment of FIG. 7, processing instead proceeds to step 716. At step 716, a determination is made as to whether there is a set of remaining commands 120 that can achieve all of the incomplete goals 250-260. Responsive to a determination that there is not a set of remaining commands 120 that can achieve all of the incomplete goals 250-260, then processing proceeds to step 718 in the same manner as in the first embodiment of FIG. 5. Responsive to a determination that there is a set of remaining commands 120 that can achieve all of the incomplete goals 250-260, then processing proceeds instead to step 724. Steps 724 to 730 correspond to steps 524 to 530 of FIG. 5 and reference should be made to the earlier description of these steps.

So if no goals 250-260 have been completed in response to a command 120, then if all of the goals 250-260 can still be completed with the remaining commands 120, then the command 120 is marked as completed and is not re-executed. However, if no goals 250-260 have been completed in response to the command 120, then if all of the goals 250-260 cannot be completed with the remaining commands 120, then the command 120 is re-executed as in the first embodiment of FIG. 5.

Figure 8:
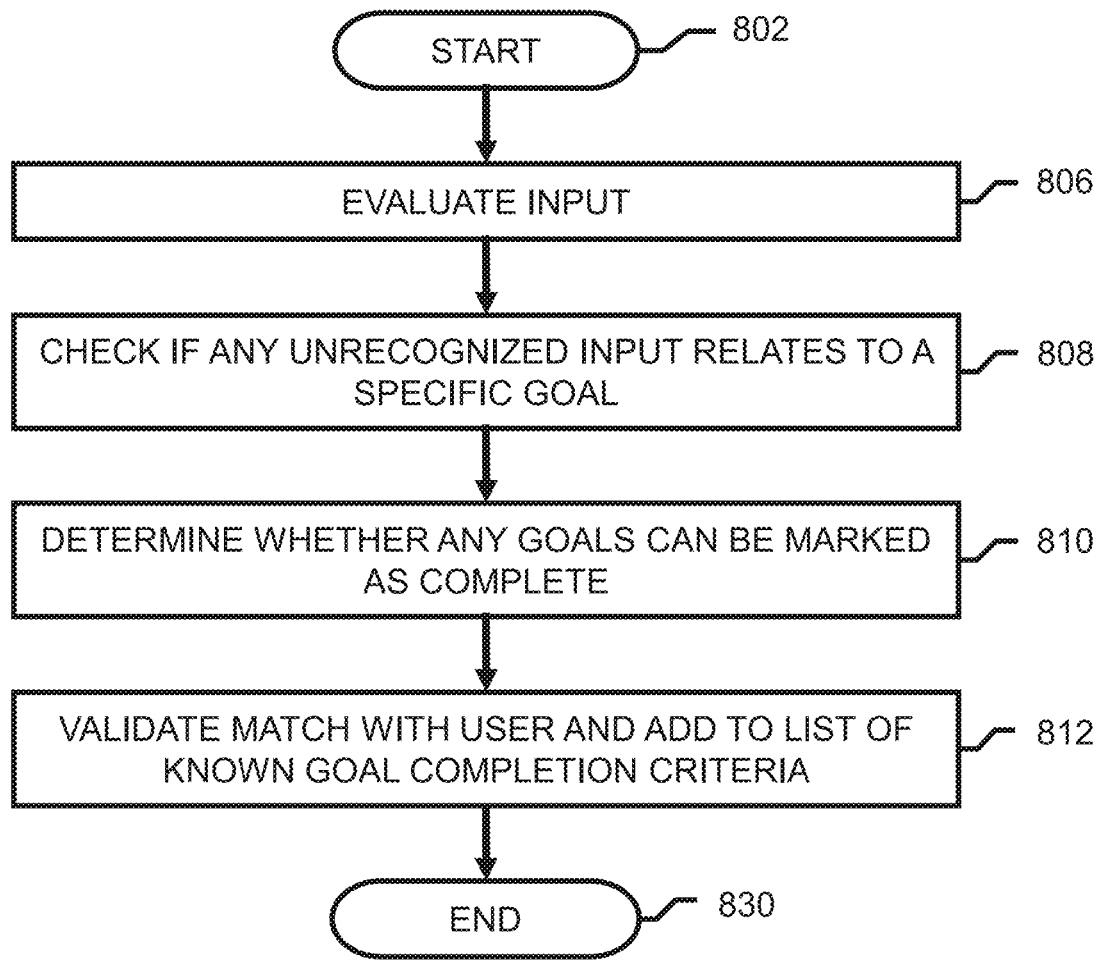
FIG. 8 shows a flow chart of a variation of the embodiments of FIGS. 5 and 6 in which unrecognized goal input is validated, in accordance with embodiments of the present invention.

FIG. 8 shows a flow chart of a variation of the embodiments of FIGS. 5 and 6 in which unrecognized goal input is validated, in accordance with embodiments of the present invention. The variation is typically executed after step 504 in FIG. 5 or step 704 in FIG. 7. The method described here replaces step 506 in FIG. 5 or step 706 in FIG. 7. The method starts at step 802 Step 806 corresponds to step 506 of FIG. 5 and step 706 of FIG. 7. At step 808, a check is made as to whether any unrecognized input classifies as related to a specific goal 250-260. In an embodiment, if the response from the user is unrecognized, then natural language classification is used to determine if any of the goals 250-260 could be satisfied by the received input. In an embodiment where the commands 120 are questions and the inputs are answers, a check is made to see if any of the unrecognized input corresponds to words that are synonyms of any of the known answers associated with a goal 250-260, which may include, for example, inside as a synonym of indoors and outside as a synonym of outdoors. In this way, new words can be learned by looking at what inputs are provided by users. At step 810, the classified input is checked to see whether any goals 250-260 can be marked as complete. At step 812, the match to one of the known answers associated with a goal 250-260 is validated with the user, that is, the user is asked to confirm, for example, that when the user said "inside", the user was happy for the response to be treated as the response "indoors". If the user responds that the user agrees to the response, the input provided can be added to the list of known goal completion criteria. The method ends at step 830. On completion, step 514 of FIG. 5 or step 714 of FIG. 7 is then executed.

As multiple commands 120 are executed, there may be multiple user inputs that complete the same goal 250-260 more than once. In an embodiment, each of the goals 250-260 has an associated indicator of certainty, the indicator being increased in response to each user response which satisfies the goal 250-260. The indicator may be decreased in response to a user providing a response that is inconsistent with an earlier response. For example, in response to the command "Where will you use it?", a user may respond with "inside" and also respond with "kitchen". Both of these responses lead to satisfaction of the "Indoor or outdoor" goal. As the user has responded to two commands to satisfy the same goal, the indicator of certainty of that goal may be set to 2. If, in response to the command "Where will you use it?", a user responds with "inside" and also responds with "yard", then these responses lead to different satisfactions of the "Indoor or outdoor" goal. As the user has responded to two commands in different ways to satisfy the same goal, the indicator of certainty of that goal may be set to 0.

In an embodiment, in order to improve the relevancy of goals over time, the weightings associated with goals may be changed in response to how often the goals are satisfied by a command associated with a superior node. In this way, the importance of each goal can be learned by understanding how many times a user completes one goal in preference to another goal when a command with multiple subordinate goals is executed. For example, if the command "Tell me your requirements" more frequently receives a response of "red" (a color answer) over "big" (a size answer), then the color goal weighting would be increased. Over time, the weightings of the goals would be prioritized, based on what input is typically received, which in turn, has the effect of re-prioritizing the order in which the commands are issued, that is, questions are asked.

The embodiments described above complete a set of goals for one specific purpose. The directed tree graph is a single tree with a single purpose. In another embodiment, in which there are multiple potential outcomes, the concept of a forest of directed tree graphs may be applied. The forest comprises a plurality of directed tree graphs with each of the plurality of directed tree graphs having a respective set of goals, which differ from each other. In response to an initial command being executed, further commands associated with any of the directed tree graphs having a number of goals satisfied less than a predetermined threshold are not executed.

An initial command attempts to complete as many goals as possible across the plurality of trees. An assessment is then made of which one or more of the plurality of trees needs to be completed, by looking at which trees contain goals that have been completed and removing trees with no completed goals. For example, if two out of six goals from a first tree are completed, three out of six goals from a second tree are completed and no goal out of six of a third tree are completed, then the assessment will find that the third tree is not required and all of the goals associated with the third tree are marked with a zero weighting. The calculation of command priorities means that a command associated with the third tree is unlikely executed.

Figure 9:
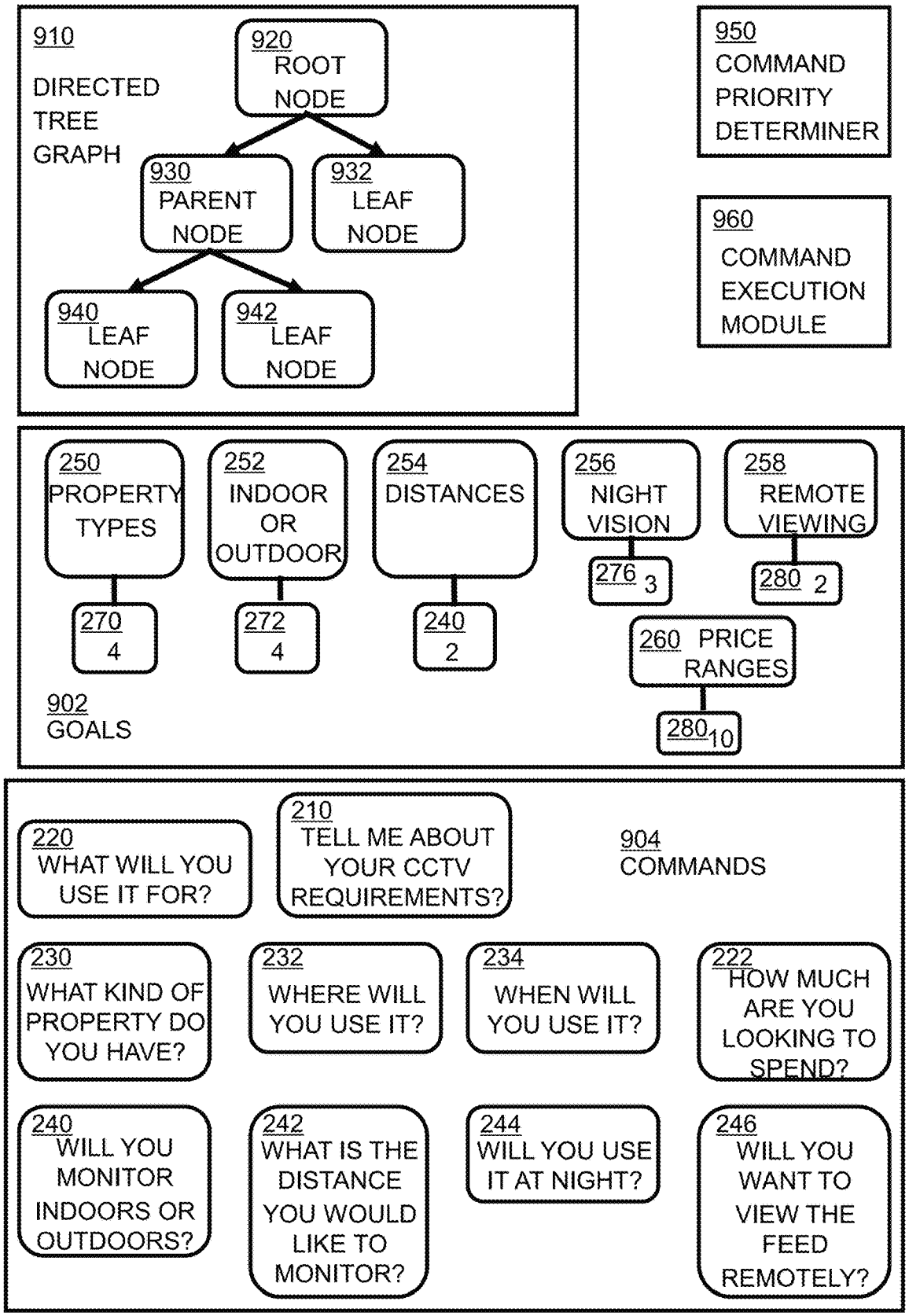
FIG. 9 shows the command generation engine of FIG. 1 for generating a sequence of commands to gather information, in accordance with embodiments of the present invention.

FIG. 9 shows a command generation engine 110 for generating a sequence of commands to gather information, in accordance with embodiments of the present invention. Command generation engine 110 comprises a plurality of goals 250-260, each one of the plurality of goals 902, 250-260 having a weighting 270-280 associated with the goal and a set of commands 904, 210-246 that, when executed, lead to completion of the plurality of goals 902, 250-260. Directed tree graph 910, comprising a root node 920, a respective plurality of leaf nodes 932-942 associated with each of the plurality of goals 902, 250-260, and one or more parent nodes 930, each node 920-942 being associated with one of the set of commands 904, 210-246, the associated one of the set of commands 904, 210-246 having the potential, when executed to complete any goals 902, 250-260 associated with the node 920-942 and all of the plurality of goals 902, 250-260 associated with any nodes 920-944 subordinate to the node 920-942.

Command priority determiner 950 determines the priority of each one of the set of commands 904, 210-246, based on the sum of the weightings 270-280 associated with goals 902, 250-260 associated with leaf nodes 940-942 subordinate to the node 920-942 associated with the command 904, 210-246.

Command execution module 960 executes one or more of the commands 904, 210-246, a command 904, 210-246 having a higher priority being executed before a command 904, 210-246 having a lower priority, any goal 902, 250-260 being satisfied by a response from a user to the command 904, 210-246 having the weighting 270-280 associated with the goal 902, 250-260 changed to zero. The command 904, 210-246 is marked as completed, the determining of the priority of each one of the set of commands 904, 210-246 is repeated after executing each command 904, 210-246.

In an embodiment, the command execution module 960 only re-executes a command 904, 210-246 that does not result in any goal 902, 250-260 being satisfied, if there is a set of remaining commands 904, 210-246 that can achieve all of the remaining goals.

In another embodiment, the command execution module 960 continues executing one or more of the commands 904, 210-246 until all goals 902, 250-260 are satisfied.

In another embodiment, the command execution module 960 continues executing one or more of the commands 904, 210-246 until a threshold of the sum of weightings 270-280 associated with unsatisfied goals 902, 250-260 is reached.

Figure 10:
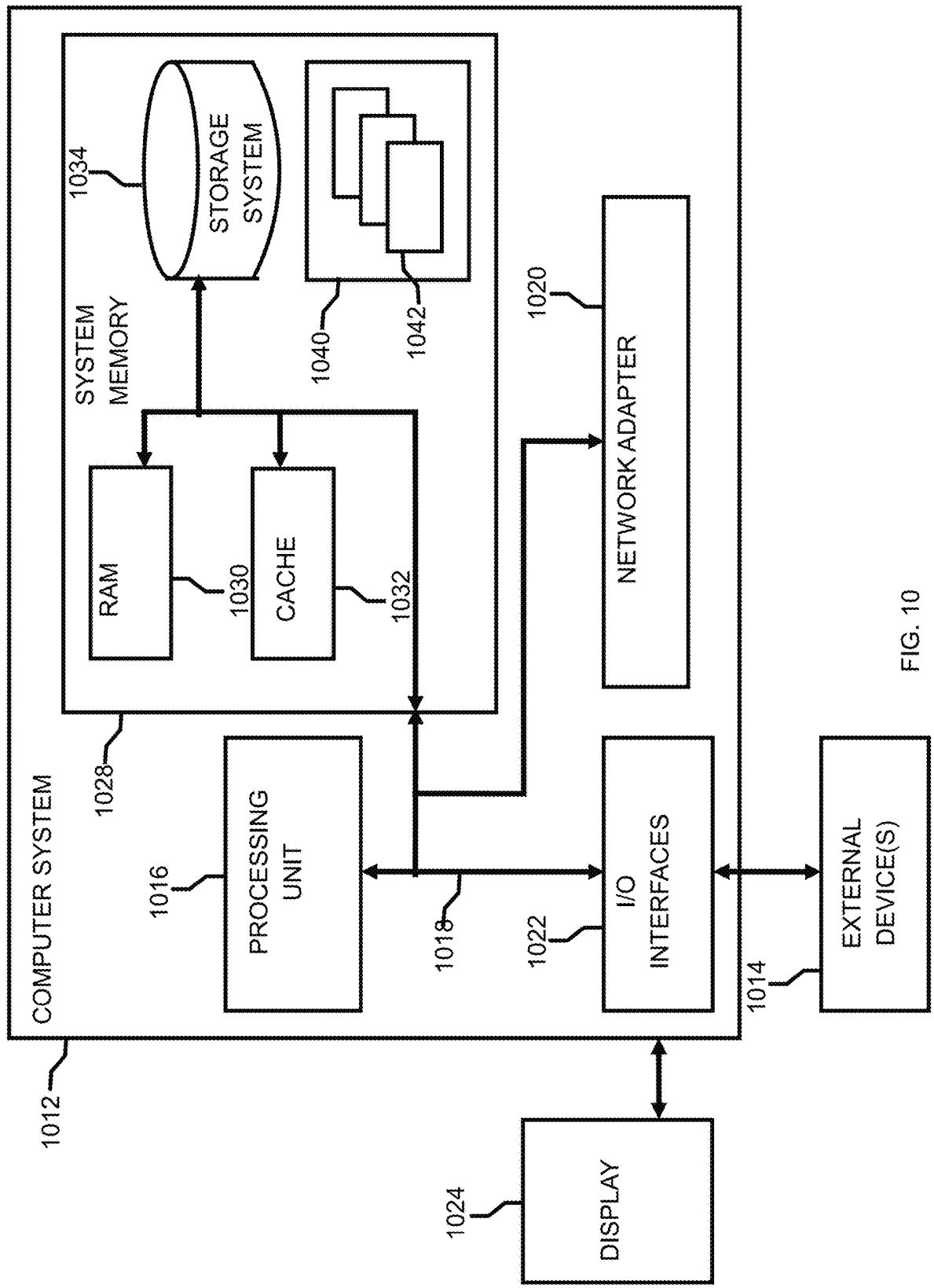
FIG. 10 is a block diagram of a computer system in which embodiments of the present invention may be utilized, in accordance with embodiments of the present invention.

Referring now to FIG. 10, a schematic of an example of a computing system is shown, in accordance with embodiments of the present invention. Computing system 1012 is only one example of a suitable computing system and is not intended to suggest any limitation as to the scope of use or functionality of embodiments of the invention described herein. Regardless, computing system 1012 is capable of being implemented and/or performing any of the functionality set forth hereinabove.

Computer system/server 1012 is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1012 is shown in the form of a general-purpose computing device. The components of computer system/server 1012 may include, but are not limited to, one or more processors or processing units 1016, a system memory 1028, and a bus 1018 that couples various system components including system memory 1028 to processor 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1012 typically includes a variety of computer system readable media. Such media may be any available media that is accessible by computer system/server 1012, and it includes both volatile and non-volatile media, removable and non-removable media.

System memory 1028 can include computer system readable media in the form of volatile memory, such as random access memory (RAM) 1030 and/or cache memory 1032. Computer system/server 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc.; one or more devices that enable a user to interact with computer system/server 1012; and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

A computer program product of the present invention may include one or more computer readable hardware storage devices having computer readable program code stored therein, said program code containing instructions executable by one or more processors of a computing system (or computer system) to implement the methods of the present invention.

A computer system of the present invention may include one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of utilizing a directed tree graph to assist a user in selecting a type of product by generating a sequence of commands to gather information, the computer-implemented method comprising:

providing, by a processor of a computing system, a plurality of goals using a command generation engine coupled to the processor and stored in a system memory of the computing system, the command generation engine including the plurality of goals, each goal of the plurality of goals having a weighting associated with the goal, and providing a set of commands that, when executed, lead to a completion of the plurality of goals, the set of commands being generated by the command generation engine;

constructing, by the processor, a directed tree graph, the directed tree graph comprising a root node, a respective plurality of leaf nodes associated with each goal of the plurality of goals, and one or more parent nodes, each node being associated with one command of the set of commands, the associated command of the set of commands having a potential, when executed to complete any goals associated with the node and all of the plurality of goals associated with any nodes subordinate to the node;

determining, by the processor, a priority of each command of the set of commands using a command priority determiner coupled to the processor and stored in the system memory, based on a sum of the weightings associated with the goals associated with leaf nodes subordinate to the node associated with the command of the set of commands; and executing, by the processor, one or more of the set of commands using a command execution module coupled to the processor and stored in the system memory of the computing system, a command having a higher priority being executed before a command having a lower priority, any goal being satisfied by a response from a user to the command having the weighting associated with the goal changed to zero, the command being marked as completed, the determining the priority of each command of the set of commands being repeated after executing each the command, thereby reducing an amount of commands needed to be executed using the directed tree graph to identify the product for the user;

wherein the computing system is implemented in a distributed cloud computing environment where tasks are performed by remote processing devices that are linked through a communications network, and program modules are located in both local and remote computer system storage media including memory storage devices.

2. The method of claim 1, wherein when the command results in none of the goals being completed, the command is only re-executed when a set of remaining commands can achieve all of the remaining goals.

3. The method of claim 1, wherein the executing one or more of the set of commands is repeated until all of the goals are completed.

4. The method of claim 1, wherein the executing one or more of the commands is repeated until a threshold of the sum of weightings associated with unsatisfied goals is reached.

5. The method of claim 1, wherein when the response from the user is unrecognized, natural language classification is used to determine whether any of the goals are satisfied by the response.

6. The method of claim 1, wherein each of the goals has an associated indicator of certainty, the indicator of certainty being increased in response to each user response which satisfies the goal.

7. The method of claim 1, wherein a plurality of directed tree graphs is constructed, each of the plurality of directed tree graphs having a respective set of goals, and in response to an initial command being executed, not executing any further commands associated with any of the plurality of directed tree graphs having a number of goals satisfied less than a predetermined threshold.

8. A computer system comprising:

a processor;

a memory device coupled to the processor; and a computer readable storage device coupled to the processor, wherein the storage device contains program code executable by the processor via the memory device to implement a method for generating a sequence of commands to gather information, the method comprising:

providing, by a processor of a computing system, a plurality of goals using a command generation engine coupled to the processor and stored in the memory device of the computing system, the command generation engine including the plurality of goals, each goal of the plurality of goals having a weighting associated with the goal, and providing a set of commands that, when executed; lead to a completion of the plurality of goals, the set of commands being generated by the command generation engine;

constructing, by the processor, a directed tree graph, the directed tree graph comprising a root node, a respective plurality of leaf nodes associated with each goal of the plurality of goals, and one or more parent nodes, each node being associated with one command of the set of commands, the associated command of the set of commands having a potential, when executed to complete any goals associated with the node and all of the plurality of goals associated with any nodes subordinate to the node;

determining, by the processor, a priority of each command of the set of commands using a command priority determiner coupled to the processor and stored in the memory device, based on a sum of the weightings associated with the goals associated with leaf nodes subordinate to the node associated with the command of the set of commands; and executing, by the processor, one or more of the set of commands using a command execution module coupled to the processor and stored in the memory device of the computing system, a command having a higher priority being executed before a command having a lower priority, any goal being satisfied by a response from a user to the command having the weighting associated with the goal changed to zero, the command being marked as completed, the determining the priority of each command of the set of commands being repeated after executing each the command, thereby reducing an amount of commands needed to be executed using the directed tree graph to identify the product for the use;

wherein the computing system is implemented in a distributed cloud computing environment where tasks are performed by remote processing devices that are linked through a communications network, and program modules are located in both local and remote computer system storage media including memory storage devices.

9. The command generation engine of claim 8, wherein the command execution module only re-executes a command that does not result in any goal being satisfied, when there is a set of remaining commands that can achieve all of the remaining goals.

10. The command generation engine of claim 8, wherein the command execution module continues executing one or more commands of the set of commands until all goals are satisfied.

11. The command generation engine of claim 8, wherein said command execution module continues executing one or more of said commands until a threshold of the sum of weightings associated with unsatisfied goals is reached.

12. A non-transitory computer program product, comprising a computer readable hardware storage device storing a computer readable program code, the computer readable program code comprising an algorithm that when executed by a computer processor of a computing system implements a method for generating a sequence of commands to gather information using a directed tree graph, the method comprising:

providing, by a processor of a computing system, a plurality of goals using a command generation engine coupled to the processor and stored in a system memory of the computing system, the command generation engine including the plurality of goals, each goal of the plurality of goals having a weighting associated with the goal, and providing a set of commands that, when executed, lead to a completion of the plurality of goals, the set of commands being generated by the command generation engine;

constructing, by the processor, a directed tree graph, the directed tree graph comprising a root node, a respective plurality of leaf nodes associated with each goal of the plurality of goals, and one or more parent nodes, each node being associated with one command of the set of commands, the associated command of the set of commands having a potential, when executed to complete any goals associated with the node and all of the plurality of goals associated with any nodes subordinate to the node;

determining, by the processor, a priority of each command of the set of commands using a command priority determiner coupled to the processor and stored in the system memory, based on a sum of the weightings associated with the goals associated with leaf nodes subordinate to the node associated with the command of the set of commands; and executing, by the processor, one or more of the set of commands using a command execution module coupled to the processor and stored in the system memory of the computing system, a command having a higher priority being executed before a command having a lower priority, any goal being satisfied by a response from a user to the command having the weighting associated with the goal changed to zero, the command being marked as completed, the determining the priority of each command of the set of commands being repeated after executing each the command, thereby reducing an amount of commands needed to be executed using the directed tree graph to identify the product for the user;

wherein the computing system is implemented in a distributed cloud computing environment where tasks are performed by remote processing devices that are linked through a communications network, and program modules are located in both local and remote computer system storage media including memory storage devices.

13. The computer program product of claim 12, wherein when the command does not result in any goal being satisfied, the command is only re-executed if there is a set of remaining commands that can achieve all of the remaining goals.

14. The computer program product of claim 12, wherein the executing one or more commands of the set of commands is repeated until all goals are satisfied.

15. The computer program product of claim 12, wherein the executing one or more commands of the commands is repeated until a threshold of the sum of weightings associated with unsatisfied goals is reached.

16. The computer program product of claim 12, wherein when the response from the user is unrecognized, natural language classification is used to determine whether any of the goals may be satisfied by the response.

17. The computer program product of claim 12, wherein each goal of the plurality of goals has an associated indicator of certainty, the indicator of certainty being increased in response to each user response which satisfies the goal.

18. The computer program product of claim 12, wherein a plurality of directed tree graphs is constructed, each of the plurality of directed tree graphs having a respective set of goals, and in response to an initial command being executed, not executing any further commands associated with any of the directed tree graphs having a number of goals satisfied less than a predetermined threshold.

* * * * *